United States Patent
Yang et al.

(10) Patent No.: US 9,906,789 B2
(45) Date of Patent: *Feb. 27, 2018

(54) ENCODING OR DECODING METHOD AND APPARATUS

(71) Applicant: Huawei Technologies Co., Ltd., Shenzhen (CN)

(72) Inventors: Haitao Yang, Shenzhen (CN); Bin Li, Hefei (CN); Houqiang Li, Hefei (CN); Jiantong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,412

(22) Filed: Jul. 13, 2017

(65) Prior Publication Data

US 2017/0310962 A1    Oct. 26, 2017

Related U.S. Application Data

(63) Continuation of application No. 15/294,498, filed on Oct. 14, 2016, now Pat. No. 9,743,080, which is a (Continued)

(30) Foreign Application Priority Data

Jan. 20, 2012    (CN) .......................... 2012 1 0018818

(51) Int. Cl.
*H04N 19/11*    (2014.01)
*H04N 19/176*    (2014.01)
(Continued)

(52) U.S. Cl.
CPC ........... *H04N 19/11* (2014.11); *H04N 19/159* (2014.11); *H04N 19/176* (2014.11);
(Continued)

(58) Field of Classification Search
CPC .... H04N 19/176; H04N 19/593; H04N 19/11; H04N 19/186; H04N 19/159;
(Continued)

(56) References Cited

U.S. PATENT DOCUMENTS 8,804,827 B2    8/2014    Yang et al.
8,861,594 B2    10/2014    Kim et al.
(Continued)

FOREIGN PATENT DOCUMENTS

CA    2822800 A1    6/2012
CN    101494792 A    7/2009
(Continued)

OTHER PUBLICATIONS

Yang et al., "Non-CE6: Remove potential duplicate modes from the candidate mode list for chroma intra prediction," Joint Collaborative Team on Video Coding (JCT-VC) of ITU-T SG16 WP3 and ISO/IEC JTC1/SC29/WG11, pp. 1-4, JCTVC-G423, XP030110407, 7th Meeting, Geneva, Switzerland (Nov. 21-30, 2011).

(Continued)

*Primary Examiner* — Nathnael Aynalem
(74) *Attorney, Agent, or Firm* — Leydig, Voit & Mayer, Ltd.

(57) ABSTRACT

Embodiments of the present invention provide an encoding or decoding method and apparatus. The method includes: extracting first information in a bitstream; determining a chroma component intra prediction mode according to the first information; when the chroma component intra prediction mode cannot be determined according to the first information, extracting second information in the bitstream; and determining the chroma component intra prediction mode according to the second information, where the first information includes information for indicating whether the chroma component intra prediction mode is a DM mode or an LM mode, the second information is used to indicate a remaining mode as the chroma component intra prediction mode, and the remaining mode is one of available chroma (Continued)

component intra prediction modes other than a mode that may be determined according to the first information.

20 Claims, 5 Drawing Sheets

Related U.S. Application Data continuation of application No. 14/750,608, filed on Jun. 25, 2015, now Pat. No. 9,503,729, which is a continuation of application No. 14/317,083, filed on Jul. 25, 2014, now Pat. No. 9,325,993, which is a continuation of application No. 14/102,186, filed on Dec. 10, 2013, now Pat. No. 8,804,827, which is a continuation of application No. PCT/CN2012/080334, filed on Aug. 20, 2012.

(51) Int. Cl.
| H04N 19/186 | (2014.01) |
| H04N 19/159 | (2014.01) |
| H04N 19/46 | (2014.01) |
| H04N 19/44 | (2014.01) |
| H04N 19/593 | (2014.01) |
| H04N 19/196 | (2014.01) |
| H04N 19/463 | (2014.01) |

(52) U.S. Cl.
CPC ......... *H04N 19/186* (2014.11); *H04N 19/196* (2014.11); *H04N 19/44* (2014.11); *H04N 19/46* (2014.11); *H04N 19/463* (2014.11); *H04N 19/593* (2014.11)

(58) Field of Classification Search
CPC ............... H04N 19/463; H04N 19/61; H04N 19/00569; H04N 19/44; H04N 19/46; H04N 19/196; H04N 19/00278; H04N 19/105; H04N 19/157; H04N 19/52; H04N 19/597; H04N 19/96; H04N 19/00763; H04N 19/119; H04N 19/50; H04N 19/70; H04N 19/00018; H04N 19/00303; H04N 19/00587; H04N 19/103; H04N 19/14; H04N 19/187; H04N 19/194; H04N 19/197; H04N 19/30; H04N 19/109; H04N 19/122; H04N 19/13; H04N 19/136; H04N 19/147; H04N 19/172; H04N 19/42; H04N 19/428; H04N 19/436; H04N 19/59; H04N 19/91; H04N 19/107
USPC .................................. 375/240.01–240.29
See application file for complete search history.

(56) References Cited

U.S. PATENT DOCUMENTS

| 9,008,181 | B2* | 4/2015 | Chen .................... H04N 19/159 375/240.15 |
| 2008/0043845 | A1 | 2/2008 | Nakaishi |
| 2009/0034857 | A1 | 2/2009 | Moriya et al. |
| 2009/0175334 | A1 | 7/2009 | Ye et al. |
| 2011/0255591 | A1* | 10/2011 | Kim .................... H04N 19/107 375/240.02 |
| 2012/0082210 | A1 | 4/2012 | Chien et al. |
| 2012/0224777 | A1 | 9/2012 | Kim et al. |
| 2012/0287995 | A1 | 11/2012 | Budagavi |
| 2013/0114700 | A1 | 5/2013 | Moriya et al. |
| 2013/0272401 | A1* | 10/2013 | Seregin ............ H04N 19/00533 375/240.12 |
| 2014/0086323 | A1 | 3/2014 | Chuang et al. |
| 2014/0301442 | A1 | 10/2014 | Yu |
| 2016/0241861 | A1 | 8/2016 | Choe |

FOREIGN PATENT DOCUMENTS

| CN | 101742330 A | 6/2010 |
| CN | 101822057 A | 9/2010 |
| CN | 101969561 A | 2/2011 |
| CN | 102025999 A | 4/2011 |
| CN | 102186080 A | 9/2011 |
| EP | 2086239 A2 | 8/2009 |
| EP | 2387242 A2 | 11/2011 |
| EP | 2685724 A2 | 1/2014 |
| JP | 2009105696 A | 5/2009 |
| JP | 2010110006 A | 5/2010 |
| JP | 2014500692 A | 1/2014 |
| KR | 20090112692 A | 10/2009 |
| KR | 20110019855 A1 | 3/2011 |
| KR | 20150051320 A | 5/2015 |
| RU | 2010119029 A | 11/2011 |
| WO | 2009049250 A2 | 4/2009 |
| WO | 2012008125 A1 | 1/2012 |
| WO | 2012087077 A2 | 6/2012 |

OTHER PUBLICATIONS

Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, pp. 1-237, JCTVC-1103_d9, 7th Meeting, Geneva Switzerland (Nov. 21-30, 2011).
Lee et al., "Intra Prediction Method Based on the Linear Relationship Between the Channels for YUV 4:2:0 Intra Coding," IEEE, International Conference on Image Processing (ICIP), pp. 1037-1040, XP031628426, Institute of Electrical and Electronics Engineers, New York, New York (2009).
Li et al., "Non-CE6: Simplification of intra chroma mode coding," Joint Collaborative Team on Video Coding (JCT-VC) of ITU-T SG16 WP3 and ISO/IEC JTC1/SC29/WG11, pp. 1-3, XP030111353, JCTVC-H0326, 8th Meeting, San Jose, CA (Feb. 1-10, 2012).
Kim et al., "Signalling chroma intra prediction mode," Joint Collaborative Team on Video Coding (JCT-VC) of ITU-T SG16 WP3 and ISO/IEC JTC1/SC29/WG11, pp. 1-3, XP030111502, JCTVC-Hxxx, 8th Meeting, San Jose, CA (Feb. 1-10, 2012).
Sze et al., "BoG Report on Intra Mode Coding", Joint Collaborative Team on Video Coding (JCT-VC) of ITU-T SG 16 WP3 and ISO/IEC JTC1/SC29/WG11, pp. 1-5, JCTVC-G1017, 7th Meeting, Geneva, Switzerland (Nov. 21-30, 2011).
Chen et al., "CE6.a: Chroma intra prediction by reconstructed luma samples," Joint Collaborative Team on Video Coding (JCT-VC) of ITU-T SG16 WP3 and ISO/IEC JTC1/SC29/WG11, pp. 1-7, JCTVC-D350, 4th Meeting, Daegu, Korea (Jan. 20-28, 2011).
Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, pp. 1-215, XP030111032, JCTVC-G1103_d0, 7th Meeting, Geneva, Switzerland (Nov. 21-30, 2011).
"Series H: Audiovisual and Multimedia Systems; Infrastructure of audiovisual services—Coding of moving video; Advanced video coding for generic audiovisual services," Recommendation ITU-T H.264, pp. 1-686, International Telecommunication Union, Geneva, Switzerland, (Jun. 2011).
U.S. Appl. No. 15/294,498, filed Oct. 14, 2016.
U.S. Appl. No. 14/750,608, filed Jun. 25, 2015.
U.S. Appl. No. 14/839,626, filed Aug. 28, 2015.
U.S. Appl. No. 14/317,083, filed Jul. 25, 2014.
U.S. Appl. No. 14/102,186, filed Dec. 10, 2013.
U.S. Appl. No. 14/317,040, filed Jun. 27, 2014.

* cited by examiner

ENCODING OR DECODING METHOD AND APPARATUS

CROSS-REFERENCE TO RELATED APPLICATIONS

This application is a continuation of U.S. patent application Ser. No. 15/294,498, filed on Oct. 14, 2016, which is a continuation of U.S. patent application Ser. No. 14/750,608, filed on Jun. 25, 2015, now U.S. Pat. No. 9,503,729, which is a continuation of U.S. patent application Ser. No. 14/317,083, filed on Jul. 25, 2014, now U.S. Pat. No. 9,325,993, which is a continuation of U.S. patent application Ser. No. 14/102,186, filed Dec. 10, 2013, now U.S. Pat. No. 8,804,827, which is a continuation of International Patent Application No. PCT/CN2012/080334, filed Aug. 20, 2012, which claims priority to Chinese Patent Application No. 201210018818.7, filed Jan. 20, 2012. All of the aforementioned patent applications are hereby incorporated by reference in their entireties.

This application is related to U.S. patent application Ser. No. 14/839,626, filed on Aug. 28, 2015, now U.S. Pat. No. 9,351,001, and U.S. patent application Ser. No. 14/317,040, filed on Jun. 27, 2014, now U.S. Pat. No. 9,124,900. This application, U.S. patent application Ser. No. 14/839,626 and U.S. patent application Ser. No. 14/317,040 share a common domestic claim to U.S. patent application Ser. No. 14/102,186, filed Dec. 10, 2013, now U.S. Pat. No. 8,804,827.

TECHNICAL FIELD

The present invention relates to the video image processing field, and in particular, to an encoding or decoding method and apparatus.

BACKGROUND

An existing encoding or decoding technology of video images includes an intra coding technology and an inter coding technology. The intra coding refers to a technology of compressing and encoding an image content merely by using a spatial correlation within an image that is being encoded currently. The inter coding refers to a technology of compressing and encoding a current image by using a temporal correlation between the image that is being encoded currently and an encoded image. In order to improve efficiency of image intra coding, the H.264/AVC (Advanced Video Coding, advanced video coding) standard first introduced an intra prediction technology to remove a spatial information redundancy between the image block that is being encoded currently and a neighboring encoded image block. As a result, unlike earlier intra coding technologies, H.264/AVC needs to perform spatial transformation and entropy encoding only on a prediction differential signal instead of an original image signal, so as to improve the intra coding efficiency.

A video image signal generally includes one luma component and two chroma components. The HEVC (High Efficiency Video Coding, high efficiency video coding) solution is a new generation video encoding standardized solution that the International Organization for Standardization is currently working on. It inherits the intra prediction encoding technology of the H.264/AVC standard, and introduces a new intra prediction mode, the LM mode, regarding the chroma components. When the LM mode is used, a chroma component predicted value of an image block is obtained by calculation using a linear model based on a reconstruction value of resampling a luma component of a corresponding block. Therefore, the LM mode is different from a conventional directional intra prediction mode. It uses a correlation between a luma component and a chroma component of an image, and is a method of predicting a chroma component value by using a luma component value.

The HEVC solution inherits and extends the intra prediction encoding technology in the H.264/AVC standard. All available intra prediction modes for chroma components of an image block form a prediction mode set, which includes the following six prediction modes:

DM mode: performs prediction by using an intra prediction mode of a luma component of a current block as a prediction mode of a chroma component;

LM mode: calculates a predicted value of a chroma component by using a value of a luma component of a sampling point based on a linear model, where a parameter of the linear model is obtained by calculation based on a luma component value and a chroma component value of a sampling point adjacent to a current block;

DC mode: uses an average value of chroma component values of a sampling point adjacent to a current block as a predicted value of a chroma component of the current block;

Planar (Planar) mode: calculates a predicted value of a sampling point of a current block based on an assumption of a spatially linear smooth change in a value of the sampling point;

Horizontal mode: uses a chroma component value of an adjacent sampling point to the left as a predicted value of a chroma component of all sampling points within the same row of a current block; and Vertical mode: uses a chroma component value of an adjacent above sampling point as a predicted value of a chroma component of all sampling points within the same column of a current block.

In a related technology, the foregoing chroma prediction modes use a TU (Truncated Unary, truncated unary) code solution to perform encoding or decoding, where the encoding or decoding are highly complex, and decoding efficiency is low.

SUMMARY

Embodiments of the present invention provide an encoding or decoding method and apparatus which can reduce encoding or decoding complexity in video image processing and improve decoding efficiency.

In one aspect, an encoding or decoding method is provided, including: extracting first information in a bitstream; determining a chroma component intra prediction mode according to the first information; when the chroma component intra prediction mode cannot be determined according to the first information, extracting second information in the bitstream; and determining the chroma component intra prediction mode according to the second information, where the first information includes information for indicating whether the chroma component intra prediction mode is a DM mode or an LM mode, the second information is used to indicate a remaining mode as the chroma component intra prediction mode, and the remaining mode is one of available chroma component intra prediction modes other than a mode that may be determined according to the first information.

In another aspect, an encoding or decoding apparatus is provided, including a first extracting unit, a first determining unit, a second extracting unit, and a second determining unit, where the first extracting unit is configured to extract first information in a bitstream; the first determining unit is configured to determine a chroma component intra prediction mode according to the first information extracted by the first extracting unit; the second extracting unit is configured to, when the first determining unit cannot determine the chroma component intra prediction mode according to the first information, extract second information in the bitstream; and the second determining unit is configured to determine the chroma component intra prediction mode according to the second information extracted by the second extracting unit, where the first information includes information for indicating whether the chroma component intra prediction mode is a DM mode or an LM mode, the second information is used to indicate a remaining mode as the chroma component intra prediction mode, and the remaining mode is one of available chroma component intra prediction modes other than a mode that may be determined according to the first information.

The foregoing technical solutions may reduce the encoding information of a chroma mode and optimize sorting for the information to reduce encoding or decoding steps, thereby reducing encoding or decoding complexity and improving decoding efficiency.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The wording "and/or" in this document merely describes an association between associated objects, indicating that three relationships may exist, for example, A and/or B may indicate three situations: only A exists, A and B exist at the same time, and only B exists. In addition, the character "/" in this document usually represents that the former and later associated objects are in a "or" relationship.

A chroma component in an embodiments of the present invention may refer to any chroma component of two chroma components. ADC mode, a vertical mode, a horizontal mode, and a planar mode in a chroma component intra prediction mode set of HEVC are the same as corresponding modes in the H.264/AVC standard in terms of a basic principle, but are different in specific implementation methods. An LM mode and a DM mode are two newly added modes. Besides the prediction modes mentioned above, there is a replacement mode. If the DM mode is the same as one of the remaining prediction modes in a prediction mode set, the replacement mode is used to replace the chroma prediction mode that is the same as the DM mode, so as to make a new prediction mode set. The DM mode performs prediction by using an intra prediction mode of a luma component of a current block as a prediction mode of a chroma component. Therefore, the method may also equivalently determine whether an intra prediction mode of a luma component is the same as a remaining prediction mode in the prediction mode set. The replacement mode may be a prediction mode that is different from all the modes in the chroma component prediction mode set.

The chroma component prediction mode set may be different in different embodiments of the present invention. One usable chroma component prediction mode set includes a DM mode, an LM mode, a DC mode, a vertical mode, a horizontal mode, and a planar mode. Another usable chroma component prediction mode set includes a DM mode, a DC mode, a vertical mode, a horizontal mode, and a planar mode. Another usable chroma component prediction mode set includes a DM mode, an LM mode, and a default mode. Another usable chroma component prediction mode set includes a DM mode and a default mode.

The LM mode in the modes mentioned above is an optional technology in the existing HEVC solution. Under an HE (High Efficiency, high efficiency) encoding configuration condition, the LM mode is included in available modes for the chroma component intra prediction mode. In such cases, the prediction mode set includes six prediction modes. However, under an LC (Low Complexity, low complexity) encoding configuration condition, the LM mode is not included in available modes for the chroma component intra prediction mode. In such cases, the prediction mode set includes five prediction modes. In the existing HEVC solution, whether the LM mode is an available mode is determined according to a binary flag (flag) in a bitstream.

The chroma encoding solution uses a TU (Truncated Unary) code to binarize mode information of a current block, and then performs entropy encoding on a binary flag after the binarization by using a CABAC (Context-Adaptive Binary Arithmetic Coding) technology. For example, under an HE configuration condition, the six modes, namely, DM, LM, vertical, horizontal, DC, and planar modes may be presented by a TU code word 0, 10, 110, 1110, 11110, and 11111, respectively; under an LC configuration condition, the five modes, namely, DM, vertical, horizontal, DC, and planar modes may be represented by a TU code word 0, 10, 110, 1110, and 1111, respectively. A decoding end determines a prediction mode for a chroma component of a current block according to the TU code word obtained by parsing.

In fact, the TU code word may be regarded as a group of binary flags in series. In an entropy encoding or entropy decoding process, whether to continue to encode or decode the following binary flags is determined according to a value of each binary flag one by one. In addition, each binary flag in the TU code word represents a binarized determination. For example, under an LC encoding configuration condition, a TU code having a maximum value 5 is used. That is, the TU code includes a maximum of four binary flags. The first binary flag is used to determine whether a mode of a current block is a DM mode; the second binary flag is used to determine whether the chroma component prediction mode of the current block is a vertical mode; the third binary flag is used to determine whether the chroma component prediction mode of the current block is a horizontal mode; and the fourth binary flag is used to determine whether the chroma component prediction mode of the current block is a DC mode. If the chroma component prediction mode of the current block is not among the four modes described above, it must be a planar mode.

When the TU code word is used to encode and decode chroma component intra prediction mode information, a value of a previous binary flag is the basis for determining whether to encode or decode a next binary flag. This conditional encoding or decoding increases complexity of entropy encoding or entropy decoding.

The DM mode is used with a high probability, which reduces importance of other modes than the DM mode. Moreover, it is possible that the DM mode is the same as the planar mode, the DC mode, the horizontal mode, or the vertical mode, indicating that a large redundancy exists in a set of available modes, where the redundancy affects efficiency of compressing video images.

There are many available modes, where six modes are available under an HE condition, and five modes are available under an LC condition. This increases calculation complexity in a process for an encoding end to select a mode.

An embodiment of the present invention provides an encoding or decoding method to solve the above problem.

Figure 1:
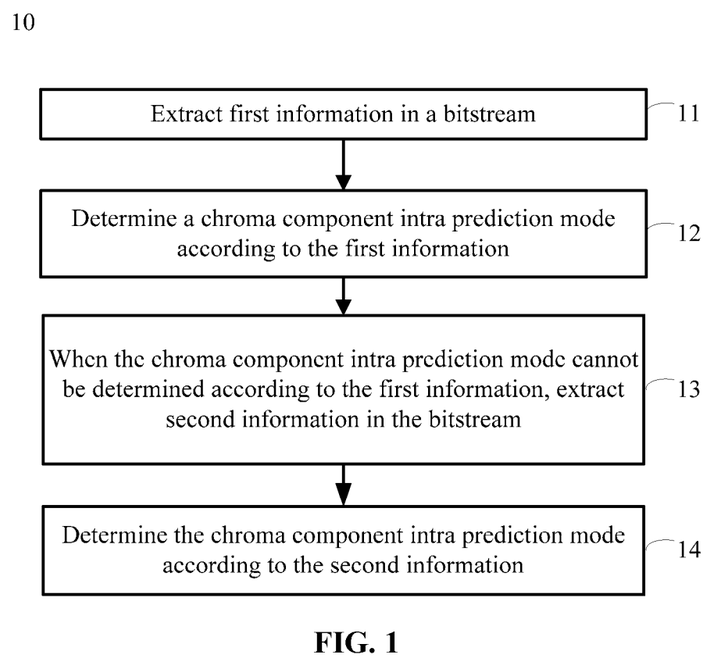
FIG. 1 is a schematic flowchart of an encoding or decoding method according to an embodiment of the present invention.

FIG. 1 is a schematic flowchart of an encoding or decoding method 10 according to an embodiment of the present invention, including the following content.

11. Extract first information in a bitstream.

The first information includes information for indicating whether a chroma component intra prediction mode is a DM mode or an LM mode.

12. Determine a chroma component intra prediction mode according to the first information.

13. When the chroma component intra prediction mode cannot be determined according to the first information, extract second information in the bitstream.

14. Determine the chroma component intra prediction mode according to the second information.

The second information is used to indicate a remaining mode of the chroma component intra prediction mode, where the remaining mode is one of available chroma component intra prediction modes other than a mode that may be determined according to the first information.

The remaining mode may be one of modes in a chroma component intra prediction mode set other than a mode that may be determined according to the first information. For example, if the first information is used to determine whether the chroma component intra prediction mode is a DM mode or an LM mode, the remaining mode may be one of the modes in the chroma component intra prediction mode set other than the DM mode and the LM mode.

When a luma component intra prediction mode is the same as the chroma component intra prediction mode in use, a replacement mode may be used to replace the chroma component intra prediction mode, where the replacement mode is one of modes that are different from the modes in the chroma component intra prediction mode set.

The embodiment of the present invention may reduce the encoding information of a chroma mode and optimize sorting for the information to reduce encoding or decoding steps, thereby reducing encoding or decoding complexity and improving decoding efficiency.

Figure 2:
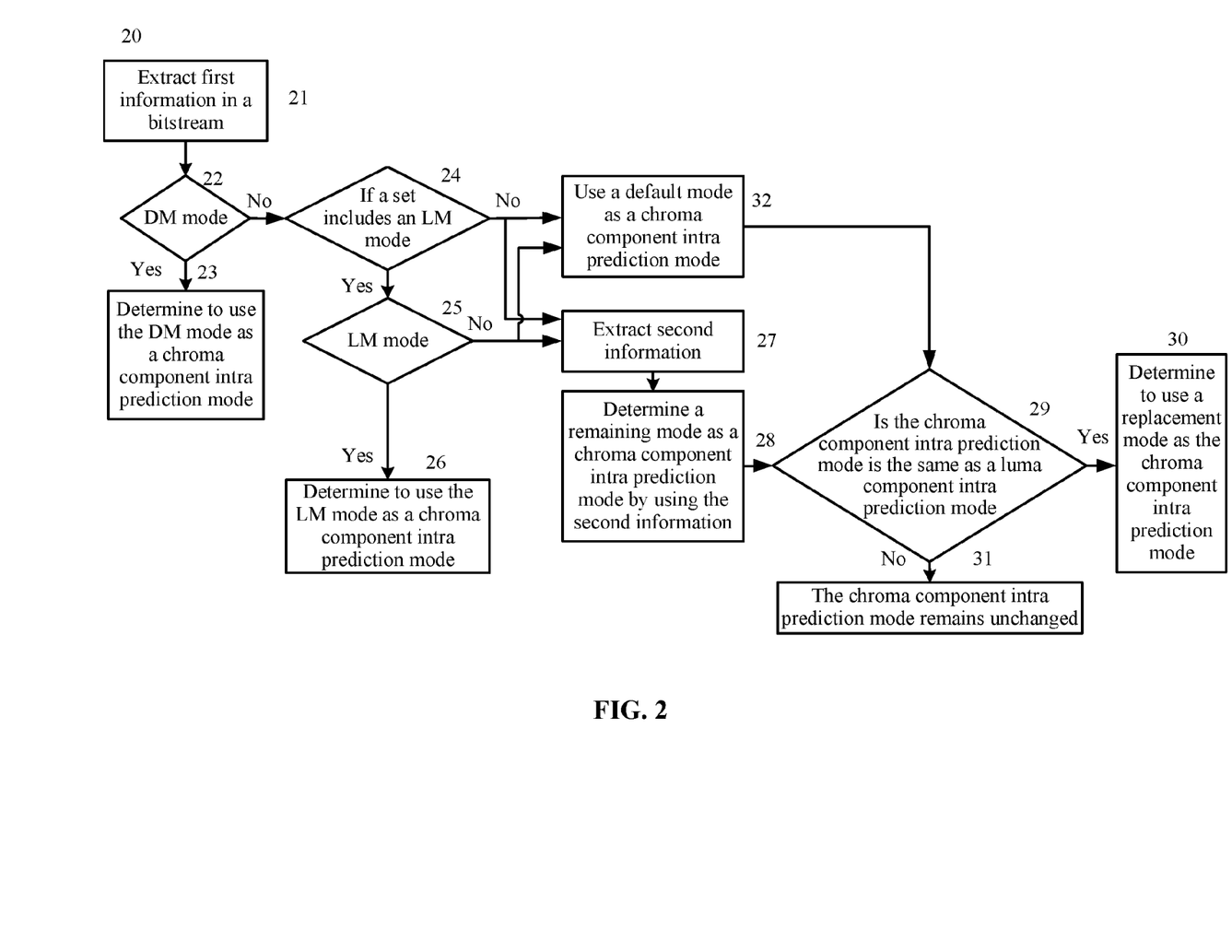
FIG. 2 is a schematic flowchart of an encoding or decoding method according to another embodiment of the present invention.

FIG. 2 is a schematic flowchart of an encoding or decoding method 20 according to another embodiment of the present invention, including the following content.

21. Extract first information in a bitstream.

The first information includes information for indicating whether a chroma component intra prediction mode is a DM mode or an LM mode. The first information may include one or two pieces of sub-information carried by a binary flag. The first information may also be carried by a TU code having a maximum value 2.

22. Determine whether a chroma component intra prediction mode is a DM mode according to the first information.

When the chroma component intra prediction mode is determined as the DM mode, that is, a result is "yes", step 23 is performed and the DM mode is used as the chroma component intra prediction mode.

When it is determined that the chroma component intra prediction mode is not a DM mode, that is, a result is "no", alternatively, step 24 is performed to determine whether a chroma component intra prediction mode set includes an LM mode, where the determining method is the same as the prior art.

When it is determined that the set includes the LM mode, that is, a result is "yes", step 25 is performed.

25. Determine whether the chroma component intra prediction mode is an LM mode according to the first information.

When the chroma component intra prediction mode is determined as the LM mode, that is, a result is "yes", step 26 is performed and the LM mode is used as the chroma component intra prediction mode.

When it is determined that the chroma component intra prediction mode is not an LM mode, that is, a result is "no", step 27 is performed.

After step 24 is performed, step 27 may also be performed if it is determined that the set does not include the LM mode, that is, a result is "no".

27. Extract second information in the bitstream.

28. Determine a remaining mode by using the second information, and use the remaining mode as the chroma component intra prediction mode.

The remaining mode may be one of modes in a chroma component intra prediction mode set other than a mode that may be determined according to the first information. For example, in the embodiment, the first information is used to determine whether the chroma component intra prediction mode is a DM mode or an LM mode; then, the remaining mode may be any of four modes in the chroma component intra prediction mode set other than the DM mode and the LM mode. The second information may carry encoding information indicating which one the remaining mode specifically is. The encoding information of the four modes may be carried by using an FL code, where a corresponding relationship is established between each mode and an FL code.

Step 29: Determine whether the chroma component intra prediction mode determined in the previous step is the same as a luma component intra prediction mode.

If they are the same, that is, a result is "yes", step 30 is performed to determine to use a replacement mode as the chroma component intra prediction mode. The replacement mode is one of modes that are different from the modes in the chroma component intra prediction mode set.

If they are different, that is, a result is "no", step 31 is performed to determine to keep the chroma component intra prediction mode unchanged.

As an implementation method, step 32 may replace steps 27 and 28.

As another implementation method, step 29 is optional, and step 31 may be directly performed after step 32 or step 28.

32. Use a default mode as the chroma component intra prediction mode, where the default mode is one of predefined luma component intra prediction modes.

In the above technical solutions, with respect to different technologies that are used, for example, a method for carrying information, multiple steps described above may be combined, or one step may be divided and completed in multiple steps. The present invention sets no limit thereto. The implementation methods shall fall within the protection scope of the present invention.

The embodiment of the present invention may reduce the encoding information of a chroma mode and optimize sorting for the information to reduce encoding or decoding steps, thereby reducing encoding or decoding complexity and improving decoding efficiency.

Both the chroma component intra prediction mode and the luma component intra prediction mode are about the current block. Therefore, in the following embodiments, they are respectively referred to as a current block chroma mode and a current block luma mode for short, which generally may also be respectively referred to as a chroma mode and a luma mode for short. In a standard, generally, there are more modes in a luma component intra prediction mode set than modes in a chroma component intra prediction mode set.

Figure 3:
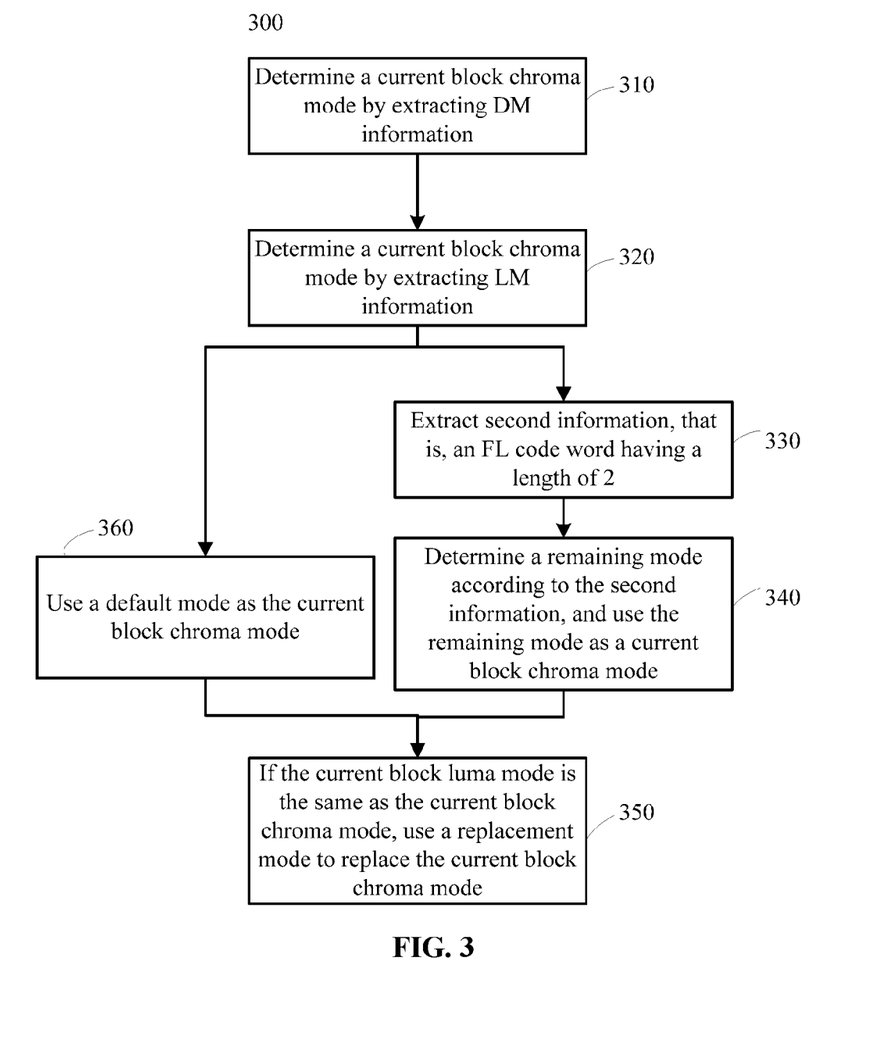
FIG. 3 is a schematic flowchart according to an embodiment of the present invention.

FIG. 3 is a schematic flowchart according to an embodiment 300 of the present invention.

In the embodiment of the present invention, a binary flag is used to carry first information. The first information may include information for indicating whether a current block chroma mode is a DM mode by using a binary flag, which is expressed as DM information.

The first information may also include information for indicating whether a current block chroma mode is an LM mode by using a binary flag, which is expressed as LM information. If the LM mode is not an available mode in chroma component intra prediction mode set, a bitstream contains no LM information, and an encoding end and a decoding end perform no encoding or decoding operation on LM information.

The second information is used to indicate a remaining mode of the chroma component intra prediction mode, where the remaining mode is one of available chroma component intra prediction modes other than a mode that may be determined according to the first information. An FL (Fix Length, fixed-length) code word having a length of 2 may be used to represent the second information. The remaining modes may be four modes, that is, vertical, horizontal, DC, and planar modes. For example, FL code words 00, 01, 10, and 11 may be used to represent the four modes, respectively.

When entropy decoding is performed on the DM information, it is allowed to use no context model or use one context model, and a context model may be selected from multiple context models according to encoding information of adjacent blocks.

When entropy decoding is performed on the LM information, it is allowed to use no context model or use one context model, and a context model may be selected from multiple context models according to encoding information of adjacent blocks.

No context model is used when entropy decoding is performed on the second information. In other words, a by-pass (equiprobability) mode is used to perform entropy decoding on a bitstream to obtain an FL code word having a length of 2, and determine the corresponding mode described according to the FL code word. This can improve throughput for entropy decoding. The by-pass mode is a binary entropy encoding or entropy decoding mode which does not use a probability model. In other words, the by-pass mode assumes an equal probability for a binary flag as 0 or 1 where entropy encoding or entropy decoding is currently performed.

It should be noted that it is the prior art to decode a binary flag without using a context model, that is, the by-pass mode in the CABAC technology. It is the prior art to decode a binary flag by using one context model. For example, in a luma intra mode encoding or decoding solution of HEVC, this entropy decoding method is performed for a first binary flag. It is the prior art to select a context model from multiple context models according to the encoding information of adjacent blocks. For example, in the HEVC solution, this entropy decoding method is used for a skip mode flag (skip flag). Therefore, details of the above three entropy decoding methods may not be described.

The embodiment 300 includes the following content.

310. Extract DM information from a bitstream by using the entropy decoding method described above. If a current block chroma mode is determined as a DM mode according to the DM information, end the mode determining procedure; otherwise, perform step 320.

320. Extract LM information from the bitstream by using the entropy decoding method described above. If the current block chroma mode is determined as an LM mode according to the LM information, end the mode determining procedure; otherwise, perform step 330.

It should be noted that, if the LM mode is not included in available modes for chroma component intra prediction, there is no LM information in the bitstream. A decoding end does not need to perform a parsing operation and this step may be skipped. The prior art may be used to determine whether the LM mode is included in the available modes for chroma component intra prediction.

330. Extract second information from the bitstream by using the entropy decoding method described above. The second information is an FL code word having a length of 2.

340. Determine remaining mode information according to the second information, and use a remaining mode as a current block chroma mode.

The current block chroma mode is determined according to a corresponding relationship between the FL code word and the remaining mode. One available corresponding relationship is described above.

Alternatively, if a current block luma mode is the same as the current block chroma mode determined in the remaining modes according to the above method, a replacement mode is used to replace the current block chroma mode used in step 340. A mode which is different from modes in a chroma component intra prediction mode set may be selected as the replacement mode. For example, a directional prediction mode from upper-right to lower-left may be used as the replacement mode. When the current block luma mode is not the same as the current block chroma mode determined from the remaining modes according to the above method, the current block chroma mode used in step 340 remains unchanged.

After the current block chroma mode is determined, the mode determining procedure may be ended.

In addition, in order to remove a redundancy in available prediction modes for a chroma component, alternatively, the set of available prediction modes for the chroma component includes only three chroma component prediction modes, that is, a DM mode, an LM mode, and a default mode. In such cases, step 360 may be used to replace steps 330 and 340, where other steps remain unchanged. In such cases, it is known according to the previous steps that the current block chroma mode is neither the DM mode nor the LM mode. The default mode may be one of predefined luma component intra prediction modes.

350. If the current block luma mode is the same as the current block chroma mode, use a replacement mode to replace the current block chroma mode.

360. Use a default mode as the current block chroma mode.

The embodiment of the present invention may reduce the encoding information of a chroma mode and optimize sorting for the information to reduce encoding or decoding steps, thereby reducing encoding or decoding complexity and improving decoding efficiency.

Figure 4:
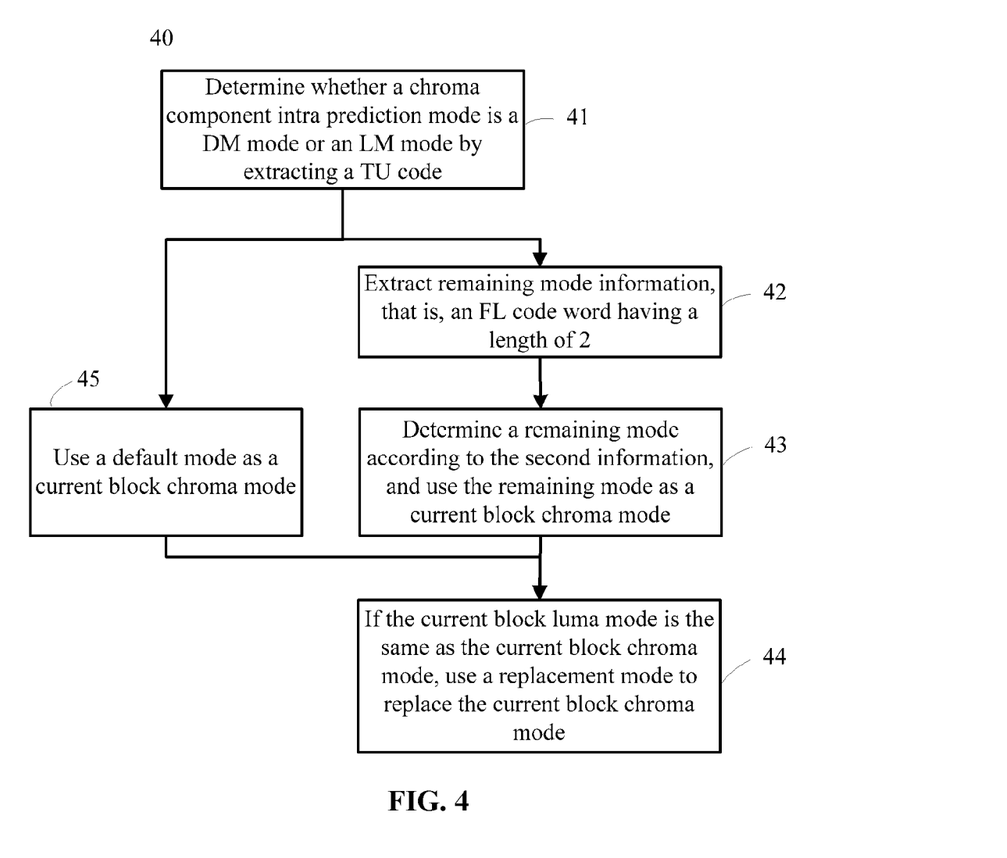
FIG. 4 is a schematic flowchart according to another embodiment of the present invention.

FIG. 4 is a schematic flowchart according to another embodiment 40 of the present invention. The difference from the embodiment 300 lies in that a TU code word having a maximum value 2 is used to carry first information, which is used to indicate whether a current block chroma mode is a DM mode or an LM mode. The TU code word may be 0, 10, and 11. The three code words may respectively indicate that the current block chroma mode is a DM mode, that the current block chroma mode is an LM mode, and that the current block chroma mode is neither the DM mode nor the LM mode, that is, the current block is one in a remaining mode set. It should be noted that if the LM mode is not included in available modes for chroma component intra prediction, the TU code word may be rolled back to a binary flag, where the binary flag indicates whether the current block chroma mode is a DM mode.

Similarly, an FL (Fix Length, fixed-length) code word having a length of 2 is used to carry second information to represent a remaining mode in a chroma prediction mode. Other aspects, for example, an entropy decoding method, are the same as the embodiment 300.

41. Determine a current block chroma mode by extracting a TU code word indicating whether the current block chroma mode is a DM mode or an LM mode.

The entropy decoding method described in the embodiment 300 is used to extract a TU code word having a maximum value 2 from a bitstream. If the current block chroma mode is determined as a DM mode according to the TU code word, end the mode determining procedure; if the current block chroma mode is determined as an LM mode according to the TU code word, end the mode determining procedure; otherwise, the current block chroma mode is determined neither as the DM mode nor as the LM mode according to the TU code word, and step 42 is performed.

It should be noted that if the LM mode is not included in available modes for chroma component intra prediction, the TU code word having the maximum value 2 is not parsed from the bitstream; instead, a binary flag is extracted from the bitstream according to the method in the embodiment 300. If the current block chroma mode is determined as a DM mode according to the binary flag, end the mode determining procedure; otherwise, perform step 42.

42. Extract second information.

Similar to step 330, the entropy decoding method described in the embodiment 300 is used to extract the second information from the bitstream. The second information is an FL code word having a length of 2.

43. Determine a remaining mode according to the second information, and use the remaining mode as a current block chroma mode.

Similar to 340 in the embodiment 300, the current block chroma mode is determined according to a corresponding relationship between the FL code word and the remaining mode. One available corresponding relationship is described above.

Alternatively, in step 44, if a current block luma mode is the same as the current block chroma mode determined from the remaining modes according to the above method, a replacement mode is used to replace the current block chroma mode used in step 43. A mode which is different from all modes in a chroma component intra prediction mode set may be selected as the replacement mode. For example, a directional prediction mode from upper-right to lower-left may be used as the replacement mode. When the current block luma mode is not the same as the current block chroma mode determined from the remaining modes according to the above method, the current block chroma mode used in step 43 remains unchanged.

After the current block chroma mode is determined, the mode determining procedure may be ended.

In addition, similar to the embodiment 300, in order to remove a redundancy in available prediction modes for a chroma component, alternatively, the set of available prediction modes for the chroma component used in the embodiment may also include only three chroma component prediction modes, that is, a DM mode, an LM mode, and a default mode. Correspondingly, as shown in FIG. 4, step 45 may also be used to replace steps 42 and 43 while other steps remain unchanged. In such cases, it is known according to the previous steps that the current block chroma mode is neither the DM mode nor the LM mode.

45. Use a default mode as the current block chroma mode.

The embodiment of the present invention may reduce the encoding information of a chroma mode and optimize sorting for the information to reduce encoding or decoding steps, thereby reducing encoding or decoding complexity and improving decoding efficiency.

Figure 5:
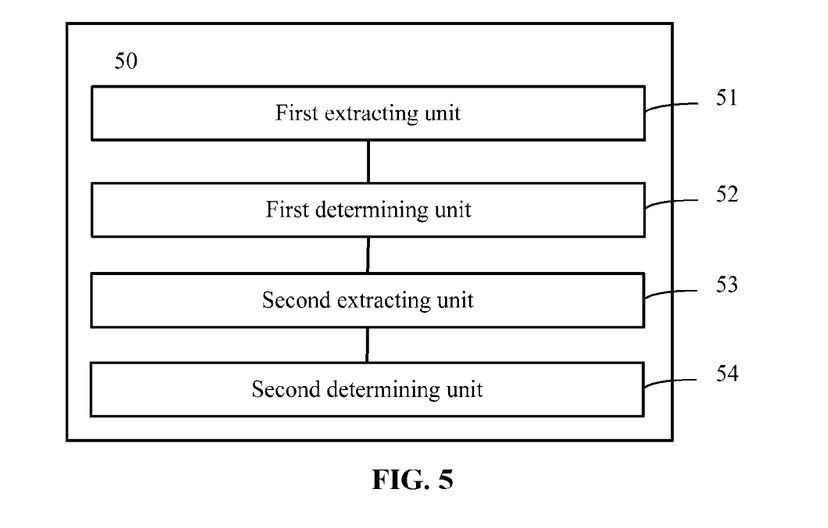
FIG. 5 is a schematic block diagram of an encoding or decoding apparatus according to an embodiment of the present invention.

FIG. 5 is a schematic block diagram of an encoding or decoding apparatus 50 according to an embodiment of the present invention. The apparatus 50 includes a first extracting unit 51, a first determining unit 52, a second extracting unit 53, and a second determining unit 54.

The first extracting unit 51 is configured to extract first information in a bitstream.

The first determining unit 52 is configured to determine a chroma component intra prediction mode according to the first information extracted by the first extracting unit 51.

The second extracting unit 53 is configured to, when the first determining unit 51 cannot determine the chroma component intra prediction mode according to the first information, extract second information in the bitstream.

The second determining unit 54 is configured to determine the chroma component intra prediction mode according to the second information extracted by the second extracting unit 53.

The apparatus 50 implements methods 20 and 300, where the specific details are not described repeatedly herein.

The embodiment of the present invention may reduce the encoding information of a chroma mode and optimize sorting for the information to reduce encoding or decoding steps, thereby reducing encoding or decoding complexity and improving decoding efficiency.

In addition, alternatively, when the first information extracted by the first extracting unit 51 includes DM information carried by a binary flag, where the DM information is used to indicate whether the chroma component intra prediction mode is a DM mode, the first determining unit 52 is specifically configured to, when the DM information indicates that the chroma component intra prediction mode is a DM mode, use the DM mode as the chroma component intra prediction mode.

Alternatively, when the first information extracted by the first extracting unit 51 includes DM information carried by a binary flag, where the DM information is used to indicate whether the chroma component intra prediction mode is a DM mode, the first determining unit 52 is specifically configured to, when the DM information indicates that the chroma component intra prediction mode is not a DM mode, use a default mode as the chroma component intra prediction mode, where the default mode is one of predefined luma component intra prediction modes.

Alternatively, when the first information extracted by the first extracting unit 51 includes DM information carried by a binary flag, where the DM information is used to indicate whether the chroma component intra prediction mode is a DM mode, the second extracting unit 53 is specifically configured to, when the first determining unit 52 determines that the DM information indicates that the chroma component intra prediction mode is not a DM mode, extract second information in the bitstream, and the second determining unit 54 is specifically configured to determine the chroma component intra prediction mode according to the second information extracted by the second extracting unit 51.

Alternatively, when the DM information of the first information extracted by the first extracting unit 51 indicates that the chroma component intra prediction mode is not a DM mode, and the first information further includes LM information carried by a binary flag, where the LM information is used to indicate whether the chroma component intra prediction mode is an LM mode, the first determining unit 52 is specifically configured to, when it is determined that the LM information indicates that the chroma component intra prediction mode is an LM mode, use the LM mode as the chroma component intra prediction mode.

Alternatively, when the DM information of the first information extracted by the first extracting unit 51 indicates that the chroma component intra prediction mode is not a DM mode, and the first information further includes LM information carried by a binary flag, where the LM information is used to indicate whether the chroma component intra prediction mode is an LM mode, the first determining unit 52 is specifically configured to, when it is determined that the LM information indicates that the chroma component intra prediction mode is not an LM mode, use a default mode as the chroma component intra prediction mode, where the default mode is one of predefined luma component intra prediction modes.

Alternatively, when the DM information of the first information extracted by the first extracting unit 51 indicates that the chroma component intra prediction mode is not a DM mode, and the first information further includes LM information carried by a binary flag, where the LM information is used to indicate whether the chroma component intra prediction mode is an LM mode, the second extracting unit 53 is specifically configured to extract second information in the bitstream when the first determining unit 52 determines that the LM information indicates that the chroma component intra prediction mode is not an LM mode, and the second determining unit 54 is specifically configured to determine the chroma component intra prediction mode according to the second information extracted by the second extracting unit 53.

Alternatively, when the first extracting unit 51 extracts the first information carried by a truncated unary (TU) code having a maximum value 2, the first determining unit 52 is specifically configured to, when it is determined that the TU code indicates that the chroma component intra prediction mode is a DM mode, use the DM mode as the chroma component intra prediction mode.

Alternatively, when the first extracting unit 5 specifically extracts the first information carried by a TU code having a maximum value 2, the first determining unit 52 is specifically configured to, when it is determined that the TU code indicates that the chroma component intra prediction mode is an LM mode, use the LM mode as the chroma component intra prediction mode.

Alternatively, when the first extracting unit 51 extracts the first information carried by a TU code having a maximum value 2, the first determining unit 52 is specifically configured to, when it is determined that the TU code indicates that the chroma component intra prediction mode is neither a DM mode nor an LM mode, use a default mode as the chroma component intra prediction mode, where the default mode is one of predefined luma component intra prediction modes.

Alternatively, when the first extracting unit 51 extracts the first information carried by a TU code having a maximum value 2, the second extracting unit 53 is specifically configured to extract second information in the bitstream when the first determining unit 52 determines that the TU code indicates that the chroma component intra prediction mode is neither a DM mode nor an LM mode, and the second determining unit 54 is specifically configured to determine the chroma component intra prediction mode according to the second information extracted by the second extracting unit 53.

Alternatively, when the second extracting unit 51 extracts the second information carried by a fixed-length (FL) code, the second determining unit 53 is specifically configured to determine a remaining mode by using the FL code, and use the remaining mode as the chroma component intra prediction mode. The second extracting unit 51 may extract the second information carried by one FL code by using an equiprobability (by-pass) mode.

Figure 6:
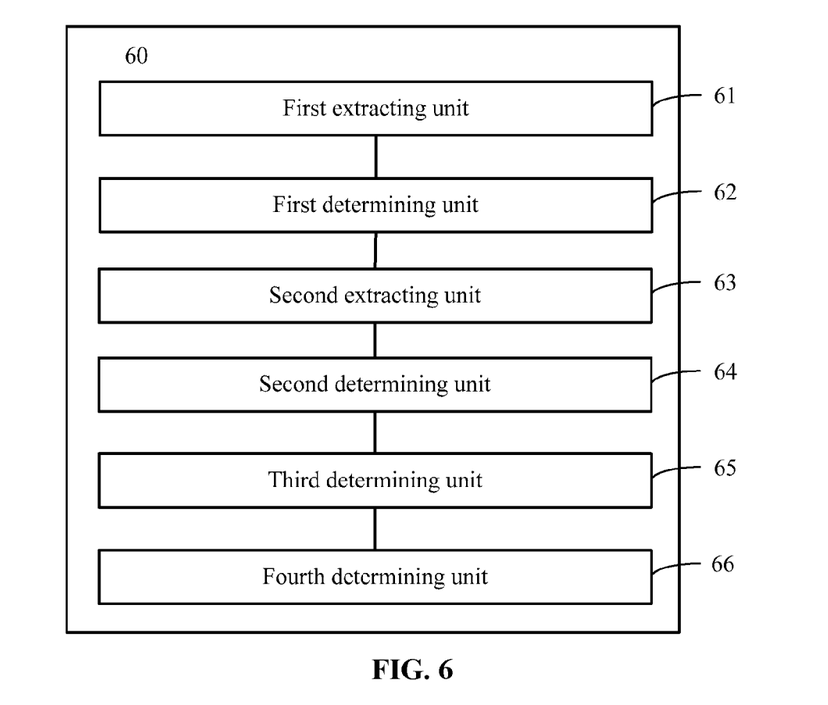
FIG. 6 is a schematic block diagram of another encoding or decoding apparatus according to an embodiment of the present invention.

FIG. 6 is a schematic block diagram of another encoding or decoding apparatus 60 according to an embodiment of the present invention. As an implementation manner, the apparatus 60 includes a first extracting unit 61, a first determining unit 62, a second extracting unit 63, a second determining unit 64, which are the same as or similar to the first extracting unit 51, the first determining unit 52, the second extracting unit 53, and the second determining unit 54 of the apparatus 50. The difference lies in that the apparatus 60 may further include a third determining unit 65 and/or a fourth determining unit 66.

The first extracting unit 61 is configured to extract first information in a bitstream.

The first determining unit 62 is configured to determine a chroma component intra prediction mode according to the first information extracted by the first extracting unit 61.

The second extracting unit 63 is configured to, when the first determining unit 61 cannot determine the chroma component intra prediction mode according to the first information, extract second information in the bitstream, The second determining unit 64 is configured to determine the chroma component intra prediction mode according to the second information extracted by the second extracting unit 63.

The third determining unit 65 is configured to determine whether a chroma component intra prediction mode set includes an LM mode.

When the third determining unit 65 determines that the chroma component intra prediction mode set does not include the LM mode, the first information extracted by the first extracting unit 61 includes only information for indicating whether the chroma component intra prediction mode is a DM mode. Alternatively, when the third determining unit 65 determines that the chroma component intra prediction mode set includes the LM mode, the first information extracted by the first extracting unit 61 includes information for indicating whether the chroma component intra prediction mode is a DM mode or an LM mode.

The fourth determining unit 66 is configured to, when the determined chroma component intra prediction mode is neither the DM mode nor the LM mode, determine whether a luma component intra prediction mode is the same as the determined chroma component intra prediction mode.

When the fourth determining unit 66 determines that the luma component intra prediction mode is the same as the determined chroma component intra prediction mode, a replacement mode is used to replace the determined chroma component intra prediction mode, where the replacement mode is one of modes that are different from the modes in the chroma component intra prediction mode set. Alternatively, when the fourth determining unit 66 determines that the luma component intra prediction mode is not the same as the determined chroma component intra prediction mode, the determined chroma component intra prediction mode remains unchanged.

The apparatus 60 implements methods 20 and 300, where the specific details are not described repeatedly herein.

The embodiment of the present invention may reduce the encoding information of a chroma mode and optimize sorting for the information to reduce encoding or decoding steps, thereby reducing encoding or decoding complexity and improving decoding efficiency.

A person of ordinary skill in the art may be aware that units and algorithm steps of the examples described with reference to the embodiments disclosed herein may be implemented by using electronic hardware or a combination of computer software and electronic hardware. These functions may be executed in a mode of hardware or software depending on a specific application design constraint condition of the technical solutions. A person skilled in the art may use different methods for each specific application to implement the described functions; however, this implementation shall not be deemed as exceeding the scope of the present invention.

A person skilled in the art should clearly understand that, for the convenience and brevity of description, for the specific operation processes of the above system, apparatus, and units, reference may be made to the corresponding processes in the method methods, and details are not described repeatedly here.

In the embodiments provided the present application, it should be understood that the system, apparatus, and method disclosed may be implemented in other forms. For example, the apparatus embodiment described above is merely illustrative. For example, the division of units is merely logical functional division, and there are other division forms in real application. For example, multiple units or components may be combined or be integrated to another system, or some features may be ignored or not be executed. In another aspect, the coupling, direct coupling, or communication connection therebetween which is displayed or discussed may be indirect coupling or communication connection of interfaces, apparatuses, or units, and may be electrical, mechanical, or in other forms.

The units described as separate components may be or may be not physically separate, and the components displayed as units may be or may be not physical units, and may be located in one place or be distributed on multiple network units. Part or all units may be selected depending on the actual requirements to realize the objectives of the solutions according to the embodiments.

In addition, the functional units in embodiments of the present invention may be integrated in one processing unit or exist separately as physical units, or two or more units may be integrated in one unit.

The functions may be implemented in a mode of software functional units and sold or used as an independent product, which may be stored in a computer readable storage medium. Based on such understanding, the essence of the technical solutions of the present invention or the part that makes a contribution to the prior art may be implemented in the form of software product. The computer software product is stored in a storage medium, and includes multiple instructions to enable a computer equipment (which may be a personal computer, a server, or a network equipment) to execute all or partial steps of the method described in embodiments of the present invention. The storage medium includes various media which can store program codes such as a USB flash drive, a mobile hard disk, a read-only memory (Read-Only Memory, ROM), a random access memory (Random Access Memory, RAM), a magnetic disk, or an optical disk.

The solutions provided by the embodiments of the present invention may be applied in a digital signal processing field, and be implemented by using a video encoder and a decoder. A video encoder and decoder may be widely used in various communication devices or electronic devices, such as a media gateway, mobile phone, wireless device, personal digital assistant (PDA, Personal Data Assistant), hand-held or portable computer, GPS (Global Positioning System, global positioning system) receiver/navigator, camera, video player, video camera, video recorder, and monitoring device. These devices include processor, a storage, and an interface for transferring data. The video encoder and decoder may be implemented directly by using a digital circuit or chip, such as a DSP (Digital Signal Processor, digital signal processor), or be implemented by using software code to drive a processor to execute a procedure in the software code.

The foregoing description is merely about the specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal device with a decoder for decoding video images, the terminal device configured for receiving a bitstream of a video image, the decoder configured for:
    extracting first information in a bitstream;
    parsing the first information;
    determining, according to the parsed first information, if an initial chroma component intra prediction mode for a current image block is a direct mode (DM);
        when the initial chroma component intra prediction mode for the current image block is not the DM mode, extracting second information from the bitstream;
        parsing the second information;
    determining the initial chroma component intra prediction mode according to the parsed second information, wherein the parsed second information indicates a remaining mode of the initial chroma component intra prediction mode and the remaining mode is one of available initial chroma component intra prediction modes other than the DM mode; and
    determining a final chroma component intra prediction mode according to the initial chroma component intra prediction mode for a current image block and a luma component intra prediction mode.

2. The terminal device according to claim 1, wherein the first information is carried by a binary flag.

3. The terminal device according to claim 1, wherein the second information is carried by a fix length (FL) code.

4. The terminal device according to claim 3, wherein the FL code has 2 binary strings.

5. The terminal device according to claim 4, wherein the 2 binary strings of the FL code are one of a binary string set, and the binary string set comprises 00, 01, 10, and 11, which are parsed to indicate remaining modes of the initial chroma component intra prediction mode, respectively.

6. The terminal device according to claim 1, wherein the available initial chroma component intra prediction modes comprises: DC mode, Vertical mode, Horizontal mode or Planar mode.

7. The terminal device according to claim 3, wherein (a) extracting second information from the bitstream; (b) parsing the second information; and (c) determining the initial chroma component intra prediction mode according to the second information, comprises:
    extracting the FL code from the bitstream, parsing the FL code, determining the remaining mode using the parsed FL code, and using the determined remaining mode as the initial chroma component intra prediction mode.

8. The terminal device according to claim 3, wherein extracting the second information from the bitstream comprises:
    extracting the FL code from the bitstream using an equiprobability by-pass mode.

9. The terminal device according to claim 1, wherein parsing the first information comprises performing entropy decoding on the first information with one context model; and
    wherein determining the initial chroma component intra prediction mode for the current block according to the parsed first information comprises determining the initial chroma component intra prediction mode for a current block according to the entropy decoded first information.

10. The terminal device according to claim 1, further comprising:
    when it is determined that the parsed first information indicates that the initial chroma component intra prediction mode is the direct mode (DM), using the DM mode as the initial chroma component intra prediction mode;
    when it is determined that the parsed first information indicates that the initial chroma component intra prediction mode is not the DM mode, extracting the second information from the bitstream, parsing the second information and determining the initial chroma component intra prediction mode according to the second information.

11. The terminal device according to claim 1, wherein the determining a final chroma component intra prediction mode according to the initial chroma component intra prediction mode for a current image block and a luma component intra prediction mode comprises,
    when the initial chroma component intra prediction mode determined according to the parsed first information is not the DM mode, further determining that whether the luma component intra prediction mode of the current image block is as the same as the initial chroma component intra prediction mode determined according to the parsed second information;
    when it is determined that the luma component intra prediction mode of the current image block is as the same as the determined initial chroma component intra prediction mode, using a replacement mode as the final chroma component intra prediction mode, wherein the replacement mode is one of modes that are different from modes in a initial chroma component intra prediction mode set; and
    when the luma component intra prediction mode of the current image block is different from the determined initial chroma component intra prediction mode, keeping the determined initial chroma component intra prediction mode as the final chroma component intra prediction mode.

12. The terminal device according to claim 11, wherein the replacement mode comprises a diagonal directional prediction mode.

13. The terminal device according to claim 12, wherein the diagonal directional prediction mode comprises a directional prediction mode from upper-right to lower-left.

14. The terminal device according to claim 13, wherein the diagonal directional prediction mode has an intra prediction mode index 34.

15. The terminal device according to claim 2, wherein the binary flag is 0 or 1, 0 indicates the chroma component intra prediction mode for a current block is a DM mode, and 1 indicates the chroma component intra prediction mode for a current block is not a DM mode.

16. The terminal device according to claim 15, wherein the second information is carried by a fix length (FL) code, and the FL code is set following the binary flag.

17. The terminal device according to claim 16, wherein the FL code has 2 binary strings.

18. The terminal device according to claim 17, wherein the 2 binary strings of the FL code are one of binary string set, the binary string set comprises 00, 01, 10, and 11, which are parsed to indicate remaining modes of the chroma component intra prediction mode, respectively.

19. The terminal device according to claim 18, the binary flag and the 2 binary strings of the FL code form a consecutive binary strings with length of 3 bits.

20. A non-transitory, computer readable medium including instructions for execution by a processor such that when the instructions are executed by the processor, the processor is configured to provide the following method:

receiving a video image bitstream extracting and parsing first information from the video image bitstream;

determining, according to the parsed first information, if an initial chroma component intra prediction mode for a current image block is a direct mode (DM);

extracting and parsing second information from the bitstream when the initial chroma component intra prediction mode for the current image block is not the DM mode;

determining the initial chroma component intra prediction mode according to the parsed second information that indicates a remaining mode of the initial chroma component intra prediction mode and the remaining mode is one of available initial chroma component intra prediction modes other than the DM mode; and determining a final chroma component intra prediction mode according to the initial chroma component intra prediction mode for a current image block and a luma component intra prediction mode.

* * * * *